Aug. 21, 1962 T. H. BATZER 3,050,236
RENEWABLE LIQUID GETTERING PUMP
Filed April 26, 1960
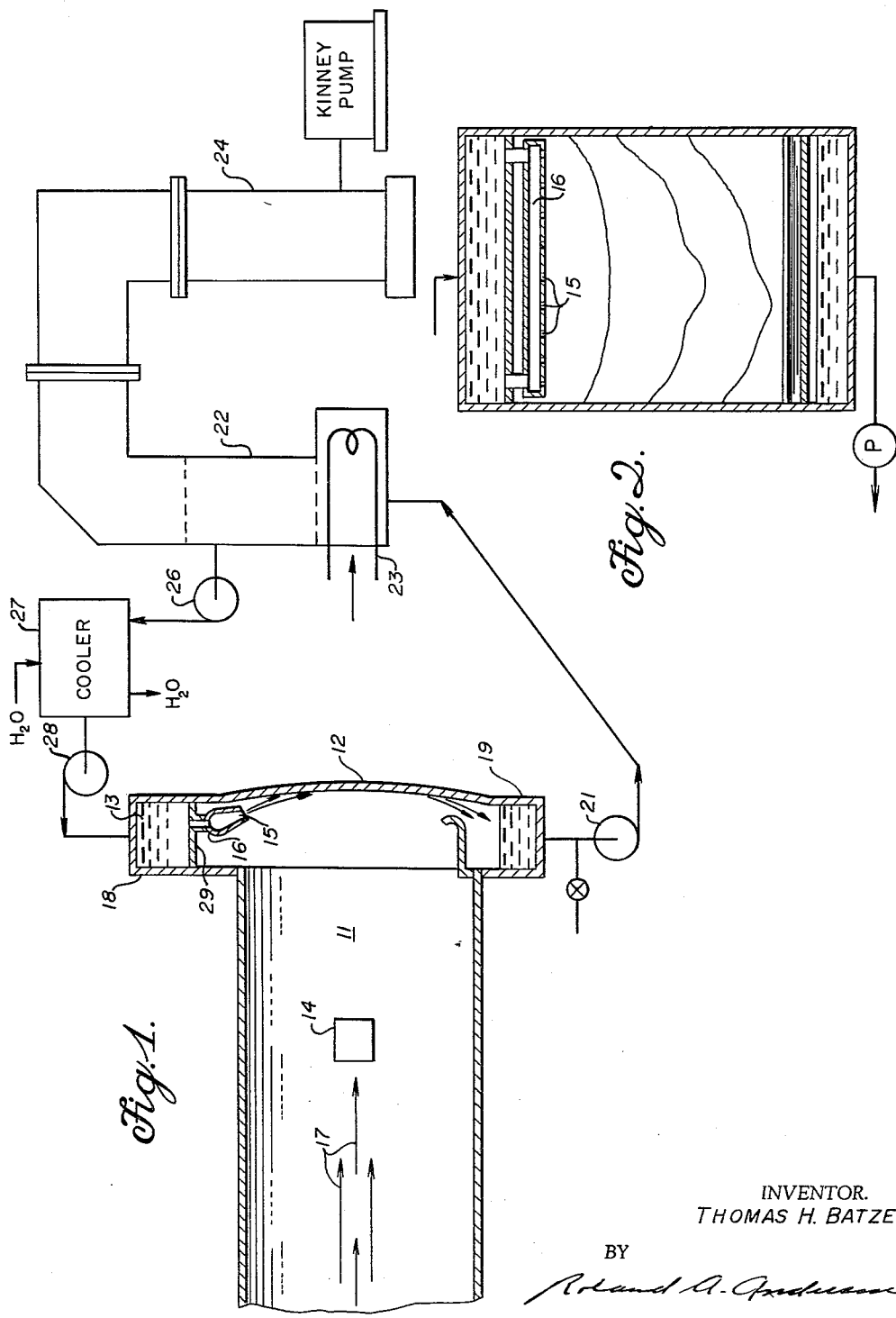
INVENTOR.
THOMAS H. BATZER
BY
Roland A. Anderson
ATTORNEY.

3,050,236
RENEWABLE LIQUID GETTERING PUMP
Thomas H. Batzer, Livermore, Calif., assignor to the United States of America as represented by the United States Atomic Energy Commission
Filed Apr. 26, 1960, Ser. No. 24,860
4 Claims. (Cl. 230—69)

This invention relates in general to apparatus and a method for pumping gases. More particularly, it relates to apparatus and a method for the gettering method of pumping gases. The invention is particularly adaptable to use as a forepump in systems having a large pumping capacity and also in the continuous pumping and removal of particles having a directional velocity.

Throughout the specification the term "liquid gettering metal" is meant to include any metal or mixture or alloy of metals which, when heated to or otherwise maintained in its liquid state, has a tendency to absorb or enter into an absorption-desorption relationship with a surrounding charged or uncharged gaseous atmosphere. Degassing may be necessary with certain metals in order to create an absorption equilibrium at low pressures, but unless otherwise stated as used herein, the term is meant to include metals which are only partially degassed. The absorption mechanism may include chemi-sorption and other sorption phenomena as discussed hereinafter. Other liquids having the requisite properties may be substituted for liquid metals, and the term is meant to include such liquids as may be equivalent.

The invention provides a method and structure for pumping gases by simple absorption into a liquid gettering material. This is accomplished by structure which enables exposure of gaseous particles to a clean gettering liquid surface. The particles contact the surface by thermal and/or directed motion and at least a portion are absorbed. Continued absorption is assured by suitable apparatus for continuous renewal of the liquid surface and replacement with clean or desorbed liquid. Preferably such structure is used in combination with apparatus for producing, receiving or using beams of particles. Positioning of the liquid gettering material, e.g., in the form of a film flowing downward over a plate, to receive residual parts of the beam enables more efficient maintenance of vacuum conditions and lessens the pumping necessary by other vacuum apparatus employed in combination to remove relatively "cold" particles within the cavity.

In the low vacuum pressure art vacuums lower than $10^{-6}$ mm. Hg were generally not required or thought to be desirable prior to nuclear applications in the 1940's. Pressures of even this magnitude were found only in limited scientific research, generally only where low volumes were being pumped; i.e., hundreds of liters per second or less. For this purpose mechanical pumps and diffusion pumps were admirably suited. However, in the present technology of mass spectroscopy, particle accelerators, controlled thermonuclear reactions, electronic applications, space research, and associated fields, threshold pressures are frequently much lower. For example, random gas particles may produce erroneous results in mass spectroanalysis of extremely small or pure samples, and nuclear reaction thresholds may be contingent upon pressures as low as $10^{-10}$ mm. Hg or lower.

Typical optimum requirements for vacuum pumps in modern technology are exemplified in plasma containment experiments, accelerator systems and ion sources in which an almost absolute gaseous source sink relationship must be maintained. In the use of such equipment, energetic charged particles and energetic neutral particles are continually introduced or produced in the system. The vacuum pump or "sink" must be capable of both initial evacuation and consequent removal of the total output of desirable fast particles and an irreducible amount of slow neutral particles to maintain a very low density of "cold" neutral gas. Optimumly, the fast particles should be removed without initial conversion into slow ones, an operation not possible with diffusion pumps, since fast particles are difficult to entrain by the jets of a diffusion pump. Further, when fast particles are first reduced to slow ones, a larger entrance orifice must be provided, since fast particles can be "shot" through a small aperture, while slow ones can not.

In spite of these difficulties, principal reliance has generally been placed upon diffusion and mechanical pumps because of their high pumping capacity. Diffusion pumps are limited to a pumping pressure of the order of $10^{-6}$ mm. Hg, because at this pressure small amounts of the oil or other pumping liquid used tend to vaporize and diffuse back into the vacuum cavity being pumped. Arbitrarily lower pressures, at reduced evacuation rates, are attained with diffusion pumps by incorporating therewith especially designed traps in which contact and condensation of oil molecules diffusing back into the vacuum area by trapping on a surface are brought about. To attain pressures lower than about $10^{-7}$ mm. Hg in highly kinetic systems, it has been found necessary to place other pumping means in parallel with the diffusion pumps. Several such pumps mainly relied upon have been ion pumps and gettering pumps. In ion pumps gas molecules are ionized and discharged to the atmosphere or are drawn into a gettering cathode. Gettering pumps continuously vaporize or sputter a gettering metal which deposits on surface area to continuously getter random or ionized gas particles impinging thereupon.

There has now been discovered a novel apparatus and method for removing gases from vacuum cavities, particularly in situations where it is desired to entrap particles having a directional velocity. The invention comprises, broadly, contacting the atmosphere or gases to be pumped with a quantity of relatively clean low-vapor pressure liquid gettering metal or liquid, preferably in constant motion, a quantity of which is alternatively and continuously or intermittently withdrawn and degassed, as by a diffusion pump pumping over the material at the top of a reflux column. In the preferred embodiment, the liquid gettering metal is permitted to flow downward in the form of a film by gravity over the surface of a plate, whereby absorption takes place, and then into a collector at the base thereof. The liquid in the collector is continuously removed to a degassing chamber and then is returned to a reservoir which feeds the plate. Other embodiments are obviously possible.

Since the pumping action relies upon the thermal or other motion of the gases or particles themselves for entrapment, it is not contended that an ultra-high vacuum can be obtained with the pump of the invention when cold particles are present. Nonetheless there are certain advantages when used in combination with other apparatus and structure and a low level pumping effect may be obtained at atmospheric pressures, for example, in a fore pump arrangement for a diffusion pump. More important, since the gettering materials contemplated have very low vapor pressures, as low as $10^{-9}$ mm. Hg, the same pumping effect is obtained even at very low pressures as well as very high pressures because some gas is always absorbed. For this reason the apparatus may be disposed in, or combined with, other pumping means where extremely low vacuum pressures are obtained. The pump of the invention may be adapted to receive charged or neutral particles having a directional velocity directed into the molten metal, as in a particle accelerator; by utilizing the present invention to capture a large portion of the particles of the particle beam, less work need be done by a conventional pump. The pump is also adapted to use in combination with an ion pump in which the metal is disposed on or around an ion collecting surface.

Accordingly, an object of the invention is to provide an apparatus and a method for continuously removing gases from a vacuum cavity. A further object is to provide apparatus and a method for augmenting conventional vacuum equipment in the maintenance of ultra low vacuum pressures. A specific object of the invention is to provide a method and apparatus for continuously entrapping and removing residual beam particles having a directional velocity from a vacuum cavity. A further object is to provide a method and apparatus for entrapping and removing gaseous particles from a vacuum chamber in which the surface of a liquid gettering material is disposed to contact undesirable gases and particles. Another object is to continuously remove, renew, and replace the surface of such a gettering liquid disposed to receive said gases.

Another object of the invention is to provide a method and apparatus for vacuum pumping in which a quantity of degassed liquid gettering metal having a large surface area to volume ratio is exposed to gases and gaseous particles to be pumped and thereafter quickly withdrawn, degassed and recycled. A further object of the invention is to provide such an apparatus and method in which the film is formed by the continuous flow of the liquid gettering material downward over a plate disposed to receive gases. Another object is to provide such an apparatus and method in which liquid gettering metal flowing downward over the plate is removed from the vacuum chamber, degassed and thereafter recycled in the exposure and degassing steps. Another object is to provide such an apparatus and a method in which the plate over which the liquid gettering metal flows is disposed to receive a beam of particles having a directional velocity.

The invention will be better understood upon examination of the following description and drawings, of which FIGURE 1 is a cross sectional side view of the preferred embodiment of the gettering pump showing also the degassification apparatus of the invention schematically; and FIGURE 2 is a front view of the vertical wall surface of the invention over which the liquid gettering metal flows, showing the manner in which the metal is introduced along the top of the wall surface.

In the practice of the invention there will ordinarily be provided a container capable of low vacuum pressure containment and adaptable to combination with the pump of the invention. Initially the container may contain air or some other gas at atmospheric pressure, but where it is to be used to greatest advantage, i.e., maintenance of vacuum pressures in large containers in the vacuum region below $10^{-6}$ mm. Hg, the container will be most frequently pre-evacuated under conditions bringing about degassing of wall surfaces and other surfaces within the container, as with a diffusion pump. Where the vacuum cavity is being used for experimentation in many types of endeavor, such as vacuum space technology, outer space studies, mass spectroscopy, plasma containment, nuclear studies and others, particles other than air or ordinary gases will also tend to be present together with residual or degassed gaseous impurities. Such particles and gases frequently include gaseous ions, elementary energetic particles and lightweight gaseous materials such as diatomic or dissociated hydrogen, deuterium, and tritium. These particles and the gases may have a random thermal motion, but frequently will have an initial directional velocity, over a spectrum of energies rendering immediate vacuum capture difficult or uncertain. Vacuum capture and injection with negligible back diffusion into the vacuum cavity proper is especially difficult in practice where the aforementioned light gaseous particles, hydrogen, deuterium and/or tritium are present, since the random motion velocities even in relatively unexcited states are extremely rapid. Obviously, in order to attain the most favorable equilibrium, the number of bounces or collisions between gas particles or with non-capturing surfaces must be held at a minimum since the probability of back diffusion thereafter is quite large.

The critical conditions under which vacuums must frequently be maintained are exemplified in plasma containment devices wherein charged particles are contained within a suitable arrangement of electric and magnetic fields housed within a vacuum chamber. Generally, the vacuum container must be evacuated to a base pressure of $10^{-9}$ mm. Hg or lower, exclusive of the centrally contained plasma. Since charged particles may not be inserted directly into the central plasma region because of the restraining magnetic field, various methods of injecting neutral particles are used. For example, directional beams of energetic neutral particles such as hydrogen, deuterium, and tritium may be obtained through collision of energetic beams of charged particles with neutral particles or by charge exchange with charged particles, whereby entrance to the containment region may be made through the electric and magnetic fields thereof. Ions and other elementary particles are created within the containment region by plasma charge exchanges or by nuclear reactions, ionizing collisions, etc. Some of the neutral particles pass completely through the containment region and must be evacuated together with charged particles, degassed impurities, etc.

For the most efficient operation in plasma work of the type described in pumping means is disposed in parallel alignment to intercept the residual beam of charged and/or neutral particles, so that most of the particles or gases are trapped prior to the time when they slow down and wander randomly throughout the container. The vacuum cavity may be integral with the pumping cavity, but where pumping against a beam of particles, as aforementioned, a wide mouthed aperture of some depth is preferred to facilitate containment prior to the initial collision. Such problems are not peculiar to plasma containment alone but are encountered in accelerator and other high energy particle fields. Where random or thermal motion is relied upon, as in fields of endeavor where charged particles are normally absent, for introduction into the pumping cavity an aperture wide in relation to the pumping chamber is also preferred to increase the probability of entrance.

In accordance with the invention, stated in simplest terms and shown in part schematically in the figures, there is first provided a vacuum housing or tank 11 having a surface 12 over which is disposed degassed liquid gettering metal 13. Obviously the geometry of the tank and gettering metal may be varied to obtain the maximum or desired pumping effect. In the embodiment shown, the surface is a slightly curved vertical wall 12 behind the target area 14 which is subjected to a collimated or focused beam 17 of particles or gaseous matter. Liquid gettering metal 13 is continuously dispensed through orifices 15 in pipe 16 extending from an upper reservoir 18 along the top of the plate surface 12, over which it flows downward and is collected in a bottom reservoir 19. A portion of particles directed toward the target 14 from the beam source are partially deflected from or otherwise miss the target entirely and pass directly into the film of liquid gettering metal. Because of the directional velocity of the gaseous or other particles, they are driven into the metal far enough that there is virtually little desorption as long as the flow downward is constant and not interrupted. Such an arrangement therefore provides an almost absolute removal of such particles.

A pumping action is also created with respect to the "cold" particles which strike the surface of the liquid gettering metal with the force brought about by thermal motion only. However, such thermal motion is generally insufficient to "bury" the gaseous particles within the metal. Accordingly, there is a tendency for the gases to desorb from the surface of the gettering metal. Were the metal to remain in a static position, an equilibrium absorption-desorption relation would soon be reached. However, since the metal film flows downward into the lower reservoir at a constant velocity, some of the particles impinging upon the surface thereof are swept into the reservoir with the metal so that there is, in effect, a net removal of gaseous particles. While in many cases the pumping action may be a low level one with respect to "cold" particles, the actual efficiency will depend upon all of the surrounding factors including the liquid gettering metal used, the rate and temperature of flow, the state of excitation of the gaseous particles, the gaseous species, etc.

A requisite of the invention, of course, is that the gettering metal flowing downward over the plate, or otherwise exposed to the gaseous particles to be removed, must be desorbed or at least clean enough to readily absorb most of the particles which impinge thereupon. In order to accomplish this function there is conveniently provided a pump means 21 which transports spent metal from the lower reservoir 19 to a degassing tank 22. The degassing tank is provided with any conventional means for degassing the spent metal, as by electric resistance heater means 23 working in cooperation with diffusion pump 24, whereby gases desorbed by the heated metal are pumped from the surface thereof by the diffusion pump. In practice, the metal need not be completely degassed so that continuous addition of spent metal to the degassing tank 22 and continuous removal of partially degassed metal therefrom suffices, as by pump 26. The degassed metal is then passed through water-operated cooler 27 and thence to the upper reservoir 18. Since the flow requirements over the plate are dependent upon continuous flow rather than constant volume, a series of nozzles or apertures 15 in tube or pipe 16 extending from the upper reservoir 13 suffice to insure constant steady flow without forced flow and valving.

Removal of gases from the metal 13 to a point below the equilibrium saturation point at the conditions of contemplated use is also requisite to operation of the invention; this may be accomplished initially by vacuum distillation or other conventional means. While many metals are known in the art which getter gases, specific metals having low vapor pressures, low melting points, and suitable absorption and desorption properties for most of the common gases used in ultra-high vacuum work include gallium, indium, tin, bismuth, and lead and mixtures and alloys thereof. Pertinent physical properties of these metals and several alloys thereof are shown in Table I. The ability of the liquid metal to wet the conducting surface is not necessarily indicative of the potential which may be maintained across the liquid-solid interface with respect to ground. Alternatively, other metals may be selected.

*Table I*

| Metal alloy, percent wt. | Melting point, °C. | Vapor pressure | |
|---|---|---|---|
| | | mm. Hg | °C. |
| Gallium | 29.9 | 10⁻⁸ | 500 |
| Indium | 156.4 | 10⁻⁸ | 500 |
| Tin | 231.9 | 10⁻⁸ | 500 |
| Bismuth | 271.0 | 10⁻⁸ | 300 |
| Lead | 327.4 | 10⁻⁸ | 350 |
| 62.5 Ga, 21.5 In, 16 Sn | 10.7 | 10⁻⁸ | 500 |
| 62 Ga, 25 In, 13 Sn | 5 | | |
| 69.8 Ga, 17.6 In, 12.5 Sn | 10.8 | | |
| 76 Ga, 24 In | 15.7 | | |
| 92 Ga, 8 Sn | 20 | | |
| 70 Ga, 30 Sn | 60 | | |
| 49 Bi, 18 Pb, 12 Sn, and 21 In | 57.8 | | |
| 49 Bi, 18 Pb, 15 Sn, and 18 In | 57.8–69 | | |
| 32.7 Bi, 7.5 Pb, 16.7 Sn, and 43.1 In | 58.8 | | |
| 49.5 Bi, 17.6 Pb, 11.6 Sn, and 21.3 In | 58.2 | | |

Using the liquid metals gallium, indium, tin, bismuth and lead, and alloys thereof, discussed hereinabove, gettering may be restricted to the gases air, nitrogen, oxygen, hydrogen, tritium, deuterium and in general all gases which may be chemi-sorbed with these metals. This list is inclusive of most of the gases commonly used in vacuum work except the inert gases. The exact nature of the absorptive bonding forces between the gas and metal molecules is unknown. However, with many gases chemical combination appears to occur, in which a chemical compound is formed by a reversible chemical reaction; i.e., hydrogen, deuterium, tritium, and perhaps other gases combine directly with the metal to form loosely held combinations. Energy requirements for dissociation of these compounds, e.g., hydrides and nitrides, are relatively low, of the order of 30–70 kcal./mole, which may be provided generally by heating.

Degassing may therefore be conveniently accomplished by simple vaporization or distillation of the metal. Certain other gases, notably oxygen, may combine to form compounds which cannot be dissociated by simple heating. If desired, means may be provided to remove such compounds from the circulating metal system, or the spent metal can be replaced with fresh clean metal at intervals during lengthy continuous gettering operations. For short runs in which the absorptive capacity of the metal is not reached, replenishment has been found unnecessary to operation even at the lower limit of vacuum pressures attainable with the invention. Even with oxygen a large portion of the gas is held by forces other than strict chemical combination, i.e., sorption phenomena in which Van der Waals type forces appear to be the main causative factor. Although separation energies for these combinations are low, being of the order of 10 kcal./mole, equilibrium rates heavily favor retention of the gases within the metal, and there is effective gettering irrespective of the sorption mechanism. The inert gases are not sorbed to the extent other gases are retained, but sorption is sufficient to create a pumping action.

While the invention has been described with respect to several preferred embodiments, it will be apparent to those skilled in the art that numerous variations and modifications may be made within the spirit and scope of the invention and thus it is not intended to limit the invention except as defined in the following claims.

What is claimed is:

1. In an apparatus for creating a pumping action in a vacuum chamber, the combination comprising a vacuum chamber and a quantity of liquid gettering metal disposed therein for exposure of the liquid surface thereof to the interior of said chamber, and liquid transmission means for maintaining relatively clean liquid gettering metal at said surface, whereby gases in said chamber are continuously absorbed into said liquid metal.

2. In an apparatus for creating a pumping action in a vacuum chamber, the combination comprising a vacuum chamber, a generally vertical wall surface exposed to said chamber interior, a quantity of relatively clean liquid gettering metal generally covering and flowably disposed over said vertical surface, means for continuously introducing additional clean liquid gettering metal along the top of said wall surface, whereby gases in said chamber are continuously absorbed into said liquid metal.

3. In an apparatus for creating a pumping action in a vacuum chamber, the combination comprising a vacuum chamber, a generally vertical wall surface therein exposed to a cavity to be evacuated, means for continuously introducing liquid gettering metal along the top of said vertical surface, whereby said metal becomes flowably disposed over said vertical surface, means for collecting said liquid gettering metal at the base of said wall surface and means for withdrawing said liquid gettering metal remotely from said collecting means, for degassing same to atmosphere and thereafter for returning same to the top of said wall surface for recycling.

4. In an apparatus for creating a pumping action in a vacuum chamber, the combination comprising a vacuum chamber, a generally vertical wall surface therein exposed to a cavity therein to be evacuated, means for continuously feeding a liquid gettering metal along the top of said vertical surface, whereby said metal is flowably disposed and contacts the atmosphere contained within said chamber, means for collecting said spent metal flowing downwardly to the base of said wall surface, pumping and liquid transmission means, means for withdrawing said collected spent metal from said chamber, means for continuously degassing said metal withdrawn from said chamber, and pumping and transmission means for returning said degassed metal to said feeding means.

References Cited in the file of this patent

UNITED STATES PATENTS

| | | |
|---|---|---|
| 1,712,595 | Van der Poel | May 14, 1929 |
| 2,957,619 | Haine et al. | Oct. 25, 1960 |